United States Patent [19]

Cornell

[11] Patent Number: 4,594,666
[45] Date of Patent: Jun. 10, 1986

[54] TRANSMISSION MONITOR/CONTROL MICROPROCESSOR FOR CONTINUOUSLY VARIABLE POWER TRAIN

[75] Inventor: Charles R. Cornell, Naperville, Ill.

[73] Assignee: J. I. Case Company, Racine, Wis.

[21] Appl. No.: 512,832

[22] Filed: Jul. 11, 1983

[51] Int. Cl.⁴ .................. B60K 41/08; G06F 15/20
[52] U.S. Cl. ................................ 364/424.1; 74/866; 74/740
[58] Field of Search ............. 364/424.1; 74/866, 867, 74/877, 856, 862, 740, 745, 752 D; 60/395

[56] References Cited

U.S. PATENT DOCUMENTS

| | | | |
|---|---|---|---|
| 3,463,034 | 8/1969 | Miller | 74/740 |
| 3,914,938 | 10/1975 | Cornell et al. | 60/395 |
| 3,952,829 | 4/1976 | Gray | 180/105 E |
| 4,048,871 | 9/1977 | Fyock | 74/740 |
| 4,091,617 | 5/1978 | Cornell | 60/445 |
| 4,107,776 | 8/1978 | Beale | 364/424.1 |
| 4,158,290 | 6/1979 | Cornell | 60/445 |
| 4,180,979 | 1/1980 | Cornell | 60/395 |
| 4,261,229 | 4/1981 | Mizuno et al. | 74/862 |
| 4,322,798 | 3/1982 | McCoin | 364/424.1 |
| 4,425,620 | 1/1984 | Batcheller et al. | 74/866 |
| 4,459,878 | 7/1984 | Frank | 74/877 |
| 4,462,275 | 7/1984 | Mohl et al. | 364/424.1 |

OTHER PUBLICATIONS

Ealey, "Earth Movers Dig Into Computers," *Truck & Off-Highway Industries,* Jan.-Feb., 1983.
Zarotti et al., "Hydrostatic Transmissions Controls—Is There Space for Optimization?", S.A.E. Paper 780465, Apr., 1978.

*Primary Examiner*—Parshotam S. Lall
*Attorney, Agent, or Firm*—Cullen, Sloman, Cantor, Grauer, Scott & Rutherford

[57] ABSTRACT

Transmission monitor/control microprocessor primarily effective to automatically adjust the effective drive reduction ratio of a power train of the type in which such transmission is variable by step change or continuously, such as for use in farm tractors. The microprocessor adjusts the drive reduction ratio so that engine power at all levels is produced at a minimum specific fuel consumption.

1 Claim, 8 Drawing Figures

FIG_7_

FIG_8_

TRANSMISSION MONITOR/CONTROL MICROPROCESSOR FOR CONTINUOUSLY VARIABLE POWER TRAIN

CROSS REFERENCE TO RELATED APPLICATIONS

This application is a companion case to respectively coassigned U.S. Pat. No. 4,138,907 and Hennessey et al U.S. patent application Ser. No. 240,040, now U.S. Pat. No. 4,388,987 filed Mar. 3, 1981, the power train disclosures of both of which are incorporated in their entirety herein by reference.

BACKGROUND OF THE INVENTION

My invention is energy related, for the purpose of fuel conservation. It controls the effective drive reduction ratio of a power train having a continuously variable or step change transmission, such as are broadly used in various agricultural and nonagricultural vehicles and machinery, and especially the agricultural tractors.

The invention specifically utilizes a transmission monitor/control microprocessor for a variable ratio power train, primarily effective to automatically adjust the drive reduction ratio so that engine power at all levels is produced at a brake specific fuel consumption (BSFC) of substantially minimum pounds (or Kg) of fuel per horsepower hour (or KWH).

As background thereto, the material information includes but is not limited to U.S. Pat. Nos. 3,952,829, 4,180,979, 4,091,617, 4,158,290 and especially the (US) Society of Automotive Engineers Paper No. 780465 relating to BSFC and also U.S. Pat. No. 3,914,938.

SUMMARY OF THE INVENTION

An object, therefore, is to consistently achieve substantially minimum or optimum brake specific fuel consumption in a self-powered vehicle, automatically by means of a transmission monitor/digital-control microprocessor provided for a continuously variable or step change power train therein.

The power train in which the invention is specifically embodied includes a range transmission and, forwardly thereof in the drive line, a hydromechanical speed transmission equipped with pump and motor hydraulic units with variable displacement to vary the transmission ratio infinitely within limits. The range transmission has three or more speed ranges, at least some of which overlap, with infinitely variable speed characteristics, because of the just mentioned speed transmission adjustments, incrementally ranging all the way from the nominal speed afforded by the speed transmission reduction to much more reduction at a substantial ratio.

Another object of my invention, providing for anti-lugging protection of the engine under a worsening load condition, is accomplished by automatically causing the speed transmission to progressively vary from essentially a 1:1 drive ratio to greater ratios and finally a maximum speed reduction ratio as the condition progressively increases rimpull loading; meantime, the engine never lugs because the transmission is extending to it more and more of a torque advantage.

Another object is to accurately indicate to a tractor operator, when the power lever setting may require being adjusted up or down because lowest brake specific fuel consumption is beyond attainment of the speed transmission range, that is, for the power setting existing and soil condition being encountered.

An additional object is the employment of the monitor/control microprocessor and its memory so as to provide thereto a data base for the engine comprising a predetermined consecutive series of desired engine speed values productive of substantially minimum brake specific fuel consumption for a range of power settings, and thereupon repetitively determining in the microprocessor, at frequent intervals, the desired minimum brake specific fuel consumption speed for the current power lever setting, thus constantly updating the objective of the system, always under easy access to the system, and ever present for due reference and response by the system. The provision of the data base is simply a matter of known choices, namely, by table, or by other procedure such as an approximation equation.

DESCRIPTION OF THE DRAWINGS

Features, objects and advantages will either be specifically pointed out or become apparent when, for a better understanding of my invention, reference is made to the following drawings which show a preferred embodiment thereof and in which.

DESCRIPTION OF THE PREFERRED EMBODIMENT

Figure 1:
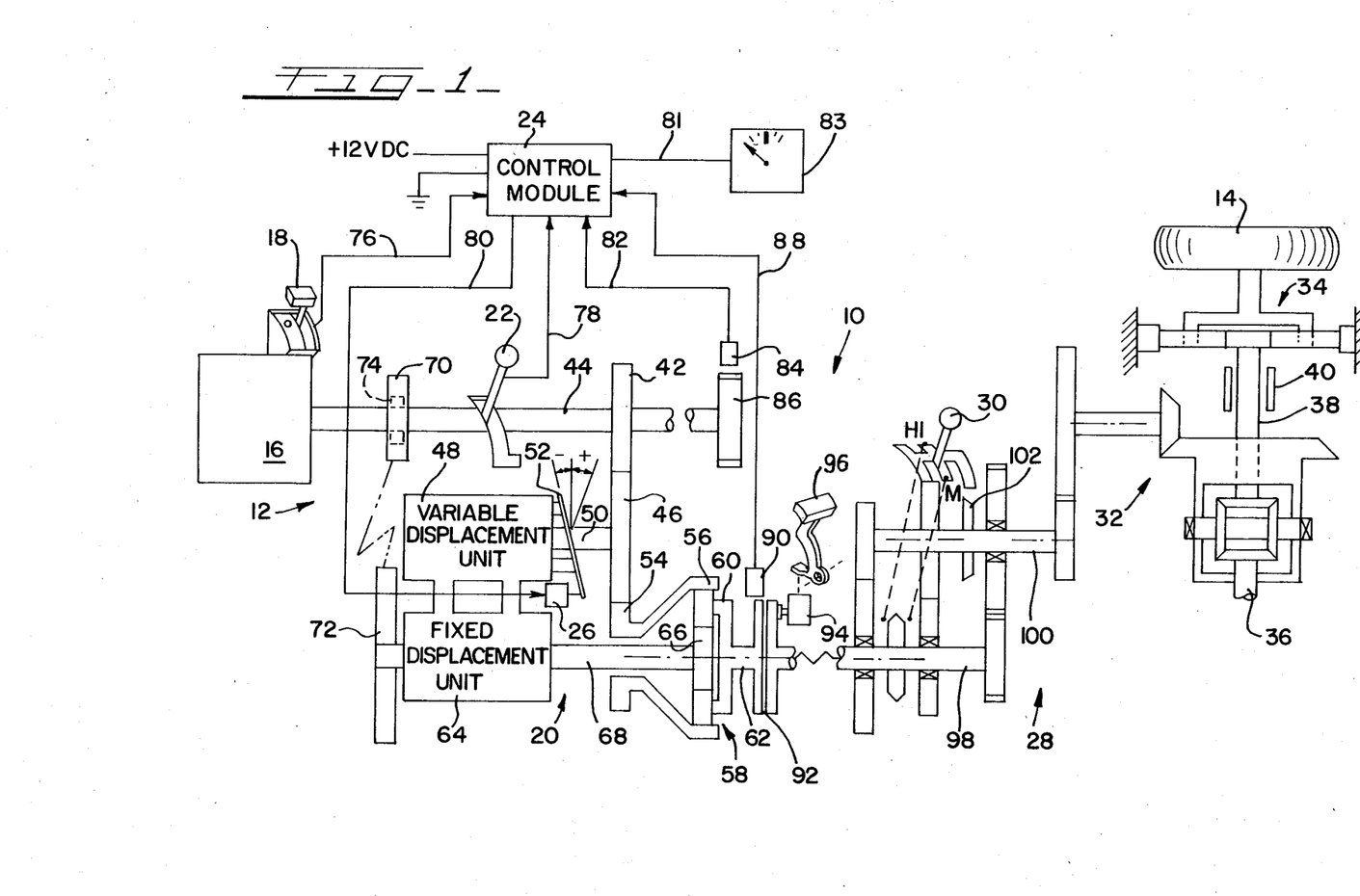
FIG. 1 is a schematic representation of a tractor power train as taken essentially in top plan view and embodying the control according to my invention.

More particularly as shown in FIG. 1, the power train 10 of a farm tractor 12 supplies power for rimpull torque at the tractor drive wheel, of which the right rear wheel 14 is representative, through a path including a mechanically governed engine 16 controlled by a governor-setting power lever 18, a hydromechanical speed transmission 20 controlled indirectly with a speed lever 22 and an electrical hydraulic actuator 26 by way of a control module 24, a three-speed, reversible range transmission 28 controlled by a gear shift lever 30, a reduction gear and differential drive 32, a planetary final drive 34 for each drive wheel and rear drive axles identified at 36 at one side and another 38 connected between the differential and final drive at that side and controlled by a steering brake 40.

In the hydromechanical speed transmission 20, a drive gear 42 on the engine powered, transmission input shaft 44 continually meshes with a countershaft gear 46 which drives a swash plate controlled, variable, axial piston hydrostatic pump 48 through an interconnecting countershaft 50. The actuator 26 tilts and holds a pump swash plate 52 so as to destroke it to zero pump displacement, and moves it therefrom through positive and negative angles for flow reversal by the pump at varying displacements.

The countershaft gear 46 also continuously meshes with a gear 54 connected to the ring gear 56 of a three element planetary gear set 58 not only providing one of two inputs but also providing two different drive modes, regenerative and split. A planetary carrier 60 serves as the element driving the planetary output shaft 62.

A reversible fixed displacement axial piston motor 64 is mechanically connected to a planetary sun gear 66 by a sun gear shaft 68, and is hydraulically connected to the variable displacement pump 48 so as to be driven by the latter at varying speeds in opposite directions. But despite the sun gear 66 being rotatable in opposite directions, nevertheless the planetary ring gear 56, carrier 60, and planetary output shaft 62 always partake of rotation in the same direction as the transmission input shaft 44. With a negative swash plate angle and a reverse moving sun gear 66, the effective hydromechanical gear reduction ratio provided at 20 is 1:2.39, and that with a positive swash plate angle and forward sun rotation (i.e., in engine direction) the gear reduction ratio effectively obtainable is 1:1.005.

A pinion 70 supported for rotation on and relative to the transmission input shaft 44 constantly meshes with a gear 72 secured to the same sun gear shaft 68 as the motor 64. The fixed ratio constraint thus imposed on pinion 70 causes it normally to rotate oppositely to the shaft 44, or to rotate in the same direction therewith but normally at a slower speed. Extremely strenuous transmission start up conditions and others can cause the pinion 70 to reach the same speed in the same direction as shaft 44, causing engagement of a one-way overspeed clutch 74 interposed between the pinion and shaft 44 so as to cause the pinion 70 to be a reaction member to sun 66 and motor 64; in that way the strenuous conditions can never make the motor 64 overspeed beyond the geared limits established by the reaction member, i.e., the pinion 70, and so the motor 64 cannot be damaged internally by excessive speed. For the omitted detail, reference is made to the mentioned coassigned Pat. No. 4,138,907 which explains fully.

A power lead 76 from the lever 18 enables the module 24 to monitor the power setting, and a speed lead 78 from the lever 22 enables the module to monitor the transmission speed setting. The module 24 is powered by +12V DC as illustrated and, by an output cable 80, automatically controls the electrical hydraulic actuator 26 for the swash plate.

A buffer output cable 81 from the module 24 enables it to indicate on an increase-reduce power meter 83 whether or not the speed transmission 20 will be able to accommodate the speed reduction required for a particular power setting, so that the operator will then know to change the setting of the lever 18 and bring back the speed transmission 20 comfortably within its effective gear reduction range.

An engine speed connection 82 from a transducer 84 enables the control module 24 to monitor, via one gear 86 indicated on the engine powered, transmission input shaft 44, the actual engine rpms at the input to the hydromechanical speed transmission 20, i.e., before gear reduction. A similar transducer 90 and transmission speed connection 88 enable the module 24 to monitor the drive side of a mid-mounted master clutch 92 for the transmission output rpms, i.e., after gear reduction. A valve controlled hydraulic actuator 94 causes internal multiple plates of the clutch 92 to disengage and to engage, respectively, under control of a tractor clutch pedal 96 when it correspondingly is depressed and is released.

The clutch 92 decouples to allow gear shifts in the range transmission 28 and can then recouple together the respective transmissions 20 and 28.

The range transmission 28 has respective sets of speed changing gears mounted on the input and output shafts 98 and 100, respectively. When the lever 30 is shifted into the position marked HI a synchronized jaw clutch sleeve shifts on shaft 98 for establishing high range, and a shift of the lever 30 into the position marked M causes an opposite synchronized jaw clutch shift on shaft 98 for medium range setting in the transmission. The sleeve 102 of a LO synchronized jaw clutch on output shaft 100 is employed for low range and additional means is provided for reverse, not shown, for the range transmission 28.

Gear ratios are selected such that the range transmission 28 provides substantial overlap in its mid range M, so that the infinitely variable speeds otherwise available in the top of the LO range can be readily duplicated, without down shifting, while in the bottom of the mid range M. Similarly, the bottom of the HI range can be duplicated with infinite variability in the top of the mid range M, without need for up shifting while variations are made within such range of overlap.

For purpose of all discussions hereinafter, the range transmission 28 will be presumed to be in its mid range M which in practice covers the infinitely variable speeds at which the present tractor, and agricultural tractors generally, are utilized approximately 90 percent of the time; those speeds are generally the ones for actual field work.

In accordance with the well-known principles of the reaction member control in hydromechanical transmissions, the effective gear reduction ratio of speed transmission 20 is established by control of the sun gear 66 in its speed and relative direction of rotation, under the accurate direction of the pump swash plate 52 according to its angle of tilt. Carefully controlled actuator means 26 is provided for the purpose.

Figure 2:
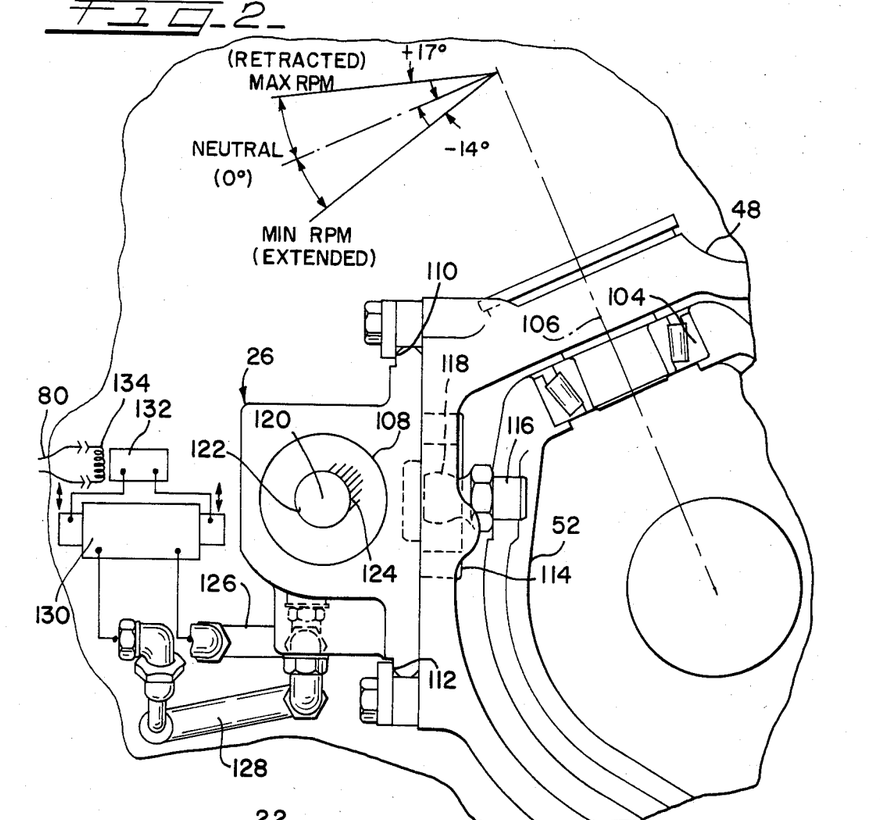
FIG. 2 is a partial, transverse-sectional view, partially schematic, showing the electrical hydraulic, variable displacement mechanism for changing the speed reduction ratio of the power train.

ELECTRICAL HYDRAULIC ACTUATOR—FIG. 2

The swash plate 52 is mounted transversely within the case of the pump 48 so as to be centered in a span of bearings, a representative one of which is the tapered bearing 104 defining the plate tilt axis 106. The double acting hydraulic cylinder 108 arranged with its housing guided in fixed motor slideways 110 and 112 has a lug 114 projecting through a window, not shown, cast as a long longitudinal slot in the side of the pump casing. A stud 116 held in screw threads in the swash plate 52 has a ball end 118 projecting laterally into, and closely confined within, a complementary slot in the lug 114. Accordingly, as the cylinder housing moves longitudinally along the side of the pump case as guided along a piston shaft axis 120 for the cylinder, the pump swash plate 52 changes its tilt and then stops within the angular swing range indicated about its tilt axis 106.

In one physically constructed embodiment of the invention, the piston shaft 122 defining the axis 120 of the double acting cylinder 108 projected through seals at opposite ends of the cylinder 108 and was fixed at anchor 124 at the proximal end as viewed in FIG. 2. Connections were such that as the distal hydraulic service line 126 was pressurized so as to introduce fluid to the far side of the fixed piston, not shown, the housing of the cylinder 108 within slideways 110, 112 retracted therein relative to proximal anchor 124 so as to tilt the swash plate for positive angularity and higher speed with less gear reduction. Conversely, pressurization of the proximal service line 128 caused advance of the housing of cylinder 108 back toward the anchor to produce negative plate angularity and more gear reduction in the speed transmission, not shown.

A two-way, closed center piloted valve 130 hydraulically longitudinally positions the cylinder 108 and hydraulically locks it, in response to a proportional pilot valve 132 commercially available. The microprocessor output cable 80 through a proportional coil 134 automatically electrically controls the pilot valve 132, the pressure output of which is proportional to pulse width and direction of the signal electrically supplied through the cable 80.

Prior to instituting this automatic tilt angling operation the operator will set the range transmission, for example, in mid range M, and will also set the other controls for speed and power by close estimation according to his experience.

Figure 3:
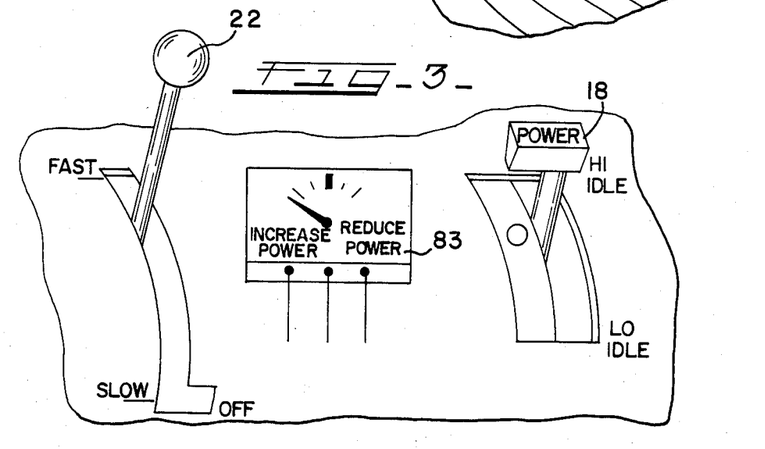
FIG. 3 is an isometric view showing the manual power train controls provided for the tractor operator.

OPERATOR CONTROLS—FIG. 3

In the field, the operator sets the power lever 18 somewhere above the LO idle position up to and including the so-called HI idle or wide open throttle position. The engine may be loaded or unloaded at this position depending upon tractor rimpull being required or not.

At the same time, the operator sets the transmission speed handle 22 at a point between or including FAST and SLOW approximating the effective gear reduction required in the speed transmission while the range transmission, remains in its aforementioned mid setting. Under a given set of field conditions, if the tractor rimpull is such that the speed tramsmission 20 is unable to achieve the proper speed reduction ratio based on the power available from the engine under those conditions, the control module 24 will cause the needle of the power meter 83 to deflect from zero reading, thereby providing the operator with a visual indication of the amount by which the setting of the power lever 18 must be altered (to either decrease or increase the power level) in order to achieve the desired speed reduction ratio.

Novelty is felt to reside in the herein recognized utility for tractor fuel conservation and in the automatic module approach hereof for satisfying that utility as can be graphically appreciated.

Figure 4:
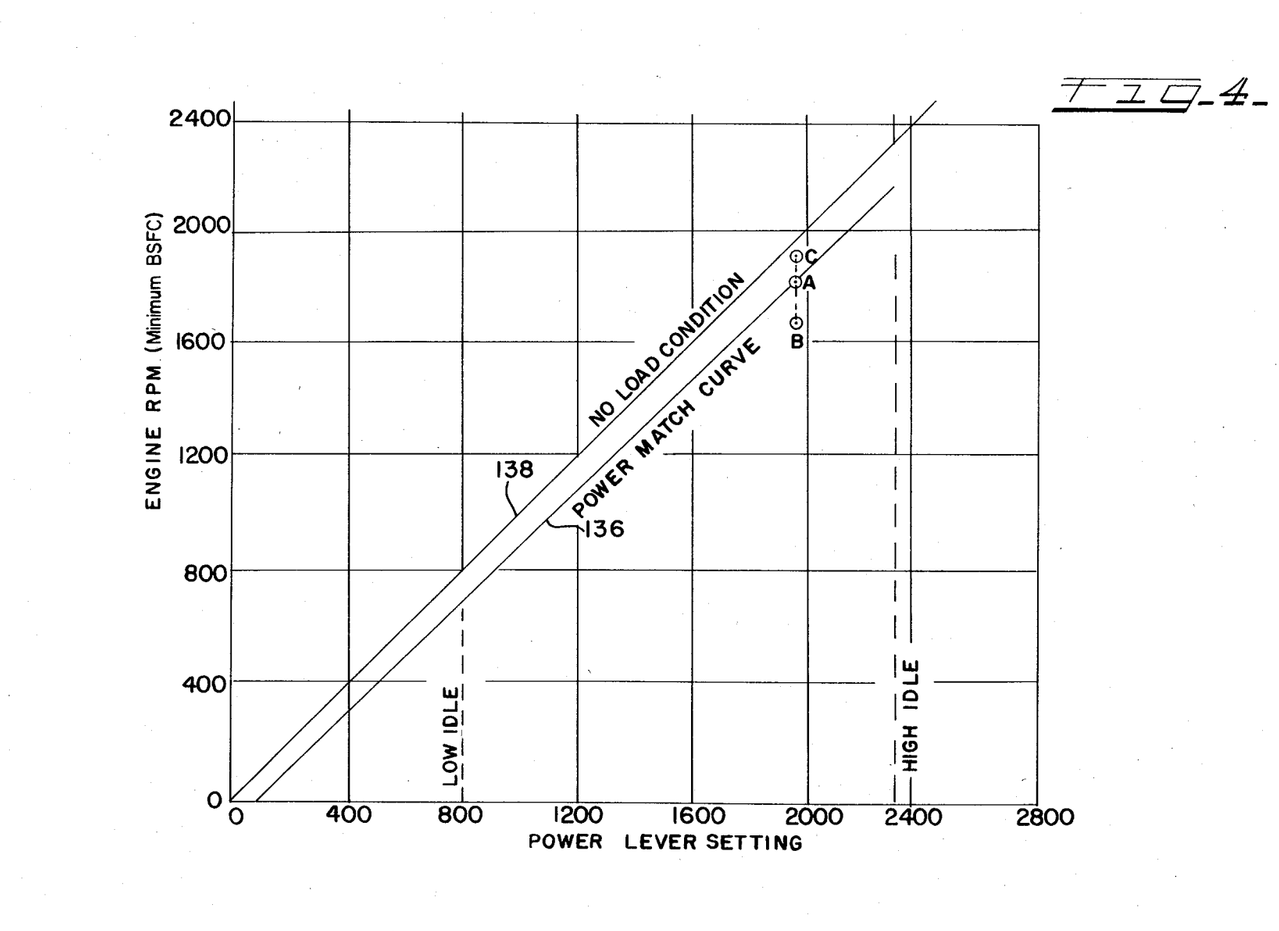
FIG. 4 is an actual speed-desired speed graph with the minimum brake specific fuel consumption curve plotted thereon for a direct injection diesel engine.

MINIMUM BSFC VS POWER LEVER POSITION—FIG. 4

This figure is a graph of actual engine speed plotted against engine power lever or throttle setting, all in revolutions per minute. The particular engine is an International Harvester DT466 six cylinder direct injection diesel engine. The power match curve 136 represents the lowest specific fuel consumption (BSFC) of the engine in pounds of fuel per horsepower hour (Kg/KWH) for each power lever setting. For example, point A is the minimum BSFC for a power lever setting of about 1950 rpm. The corresponding actual engine rpm is about 1800 rpm for the minimum BSFC point A, i.e., for that specific power lever setting. The curve 136 can theoretically never reach the no load condition curve 138 which shows higher speeds at all points because at no load BSFC is infinite.

Each power lever setting in the available range from low idle to high idle will have its own least BSFC engine speed, thereby generating the power match curve 136. One example will typify the rest in the range.

EXAMPLE I

In this example for an engine power lever setting of 1950 rpm, the automatic tilt angling of the swash plate, not shown, is required to establish an operating point A indicated on curve 136 calling for an actual engine speed of about 1800 rpm under its mechanical advantage over the load as afforded by the speed transmission.

That advantage, let us assume, occurs with an effective 1:1.5 gear reduction in the speed transmission. The control module 24 has two modes depending upon the condition encountered.

If the soil condition, for example, were to add more rimpull resistance to the tractor, a point B having an engine speed of, say 1700 rpm might be reached for the 1950 rpm power lever setting. However, the control module 24 senses this and begins its primary or power limiting mode of operation. The effective gear reduction ratio in the speed transmission is automatically changed for more reduction, for example to 1:1.7, obviously giving the engine more of a mechanical advantage so it can speed back up to the actual desired speed A, to restore the least BSFC but naturally at the expense of slowing the tractor ground speed somewhat.

In other words, temporarily increased rimpull resistance would seem normally to demand reaction by the operator to advance his power lever setting and thus compensate with increased engine power output. But with automatic power limiting as foregoing, and at optimum BSFC efficiency as described, the module automatically does the compensation without a requirement for operator intervention and without the engine being lugged down in speed by the temporarily increased load.

When rimpull resistance, of that temporarily increased amount being considered and instantly compensated for, again restores down to that lesser initial value, the control module operates in another phase of its power logic mode by sensing the resulting tendency of the temporarily assumed actual drive reduction ratio to be comparatively high for an engine speed corresponding to the calculated optimum represented at point A. To counteract this tendency to operate with too much effective gear reduction ratio appropriate to the actual engine speed sensed, the module automatically decreases the effective gear reduction ratio from 1:1.7 back down to the initial lesser ratio of 1:1.5 appropriate to a higher tractor speed. That is to say, the engine is automatically afforded less of a mechanical advantage over the (reduced) load. It can handle a greater load at its power setting and is therefore loaded up to a greater amount, and the power match is restored right back to the least BSFC value.

A contrasting cycle, completed under a different mode of operation of the module, is to be taken up in the following example to be considered.

EXAMPLE II

If, while operating at point A appearing in the graph shown in FIG. 4, soil resistance stays the same but the tractor encounters a short downslope, as an example of a lightened load, the control module 24 enters into the second, or constant ground speed mode of operation. It does so because of the actual change of the operating point to point C, say, 1900 rpm, again with a power lever setting of 1950 rpm and an effective transmission ratio of 1:1.5. Engine speed-up on such a short downslope tends to cause a finite increase of ground speed, and the speed transmission automatically causes more reduction ratio, e.g., 1:1.7, restoring the initial ground speed desired. The speed control logic mode perforce continues because, all the while, the primary power limiting logic mode has been satisfied.

So the tractor compensates by reducing ground speed back down to the original ground speed whereupon, to continue with this example, the tractor then makes the transition by bottoming out at the end of the short slope.

The cycle is completed because at the end of the slope the operating point A is resumed. That is, the module automatically adjusts the transmission setting for less gear reduction back to the originally assumed 1:1.5 ratio. Thus, from a former optimum setting condition A, the tractor without operator intervention immediately made adjustment to hold constant ground speed when on the downslope, and immediately readjusted to the former optimum setting condition to keep that same constant tractor speed when off the slope.

The control module carefully monitors the power train and has means provided for programming it for the operating modes appropriate to the conditions being monitored. An explanation follows.

Figure 5:
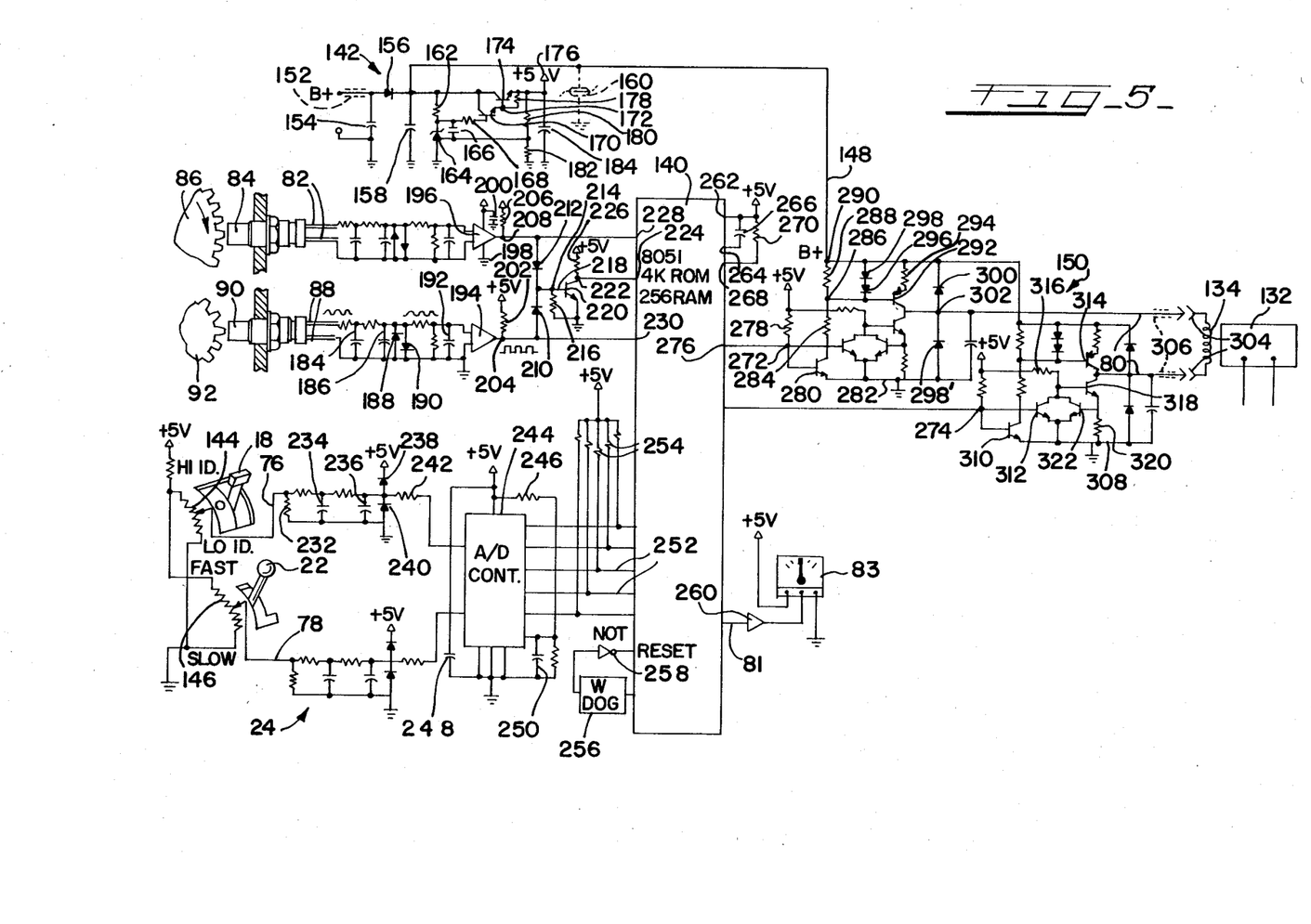
FIG. 5 schematically includes the control of FIG. 1, and further includes the operator's controls of FIG. 3 and part of the schematic portion of FIG. 2, all in an overall schematic control diagram.

MODULE—FIG. 5

At the center of the control module 24 as shown in this figure is a microprocessor computer 140 having its own memory and proper programming for the operating modes required.

Inputs include a power supply 142 for regulated +5V input power, the magnetic transducer 84 adjacent gear 86 for engine speed rpms, the magnetic transducer 90 adjacent the clutch gear 92 for transmission output speed rpms, a +5V potentiometer 144 for monitoring the setting of the power lever 18, and a speed potentiometer 146 for monitoring the transmission speed lever setting.

The outputs include the proportioning coil 134 for the swash plate pilot valve 132 for controlling the speed transmission and the power meter 83 for indicating the degree of change and its direction for the re-setting of the power lever 18 by the operator.

B+ power is impressed on the +5V power supply 142 and, by a connection 148 is also impressed on a pulse width modulated swash plate drive circuit 150. A ferrite anti-noise bead 152 is present in the B+ lead to the power supply 142 and a tantalum capacitor 154 having one plate grounded is also present thereat to reduce high frequency electromagnetic interference from entering into the power supply 142. Also present is a series-connected reverse-polarity-detecting diode 156 to insure against damage in case the power supply is connected with wrong polarity to the source of B+. An electrolytic capacitor 158 having one plate grounded filters the B+ power. Also, a varistor 160 grounded at one side will, if optionally provided, protect against noise transients occurring from the B+ source from time to time.

A resistor 162 leading from the B+ power line is series connected to ground by a Zener diode 164 having a capacitor 166 parallel connected therewith and together serving as shunt series regulator to regulate voltage of the power supply.

A resistor 168 impresses the Zener voltage on the base of an NPN transistor 170 which, through its collector, delivers to the B+ power line electrons that its emitter is pumping from a junction 172 out of the base of a second NPN transistor 174. The NPN transistor 174 conducts electrons from the +5V linear voltage regulated terminal 176 through its emitter to the B+ power line through a collector connection to the latter, and incorporates a base bias resistor 178. Two series connected resistors 180 and 182 as supplemented by a paralleled capacitor 184 serve in conjunction with the transistors to define what the regulated linear output voltage will be at +5V terminal 176.

The transmission speed connection 88 from the transducer 90 on speed transmission clutch output gear 92 transmits therein an essentially sinusoidal wave which first encounters in two stages of the circuit a pair of RC filters 184 and 186. The wave then encounters a pair of oppositely poled diode clippers 188 and 190 which clip off the waves so that they are flat on top and on bottom, limited to about 1½V peak to peak. Further RC filtering at 192 is followed by direction of the wave pulse as input to a schematically shown comparator 194. Full connections thereto are shown by way of a counterpart comparator 196 grounded at 198 and receiving +5V through a terminal connected through a capacitor 200 to ground. The comparator 196 is connected to engine speed transducer 84 in the same manner.

The regulated linear +5 voltage is supplied through a resistor 202 to the output junction 204 of comparator 194, whereas another similarly supplied resistor 206 is connected to the output junction 208 of the counterpart comparator 196.

The output at junction 204 is the square wave indicated and, similarly, the output at the comparator junction 208 is such a square wave. Those waves in one physically constructed embodiment of the invention ranged in frequency from 10 Hz to 7000 Hz and had digital form for ease in computing shaft rpms.

At the noted frequencies, the rpm signals of engine speed from 84 and transmission output speed from 90 are separately handled and analyzed by the microprocessor 140 by multiplexing, starting at their output junctions 204 and 208, respectively. A pair of diodes 210 and 212 bridging therefrom are joined in series cathode to cathode and their junction is connected to a junction 214.

A bias resistor 216 and base connector 218 from the junction 214 act in a way on an NPN transistor 220 so that, for example, the square wave pulses alone at 204 are ineffective to allow the transistor base to turn on transistor 220 through the diode 210. But the transistor 220 has a special inverter function under multiplexing circumstances because of the junction connection 222 of its collector to a pin 224 on the microprocessor 140 and also to the linear voltage regulator's +5V through a resistor 226. Thus, according to multiplexing procedure, the microprocessor 140 in order to measure engine rpms has a pin 228 go positive in readiness as to when the square wave causes junction 208 likewise to go positive. At that point of coincidence, the inverter transistor 220 by inversion causes the pin 224 to go low, starting a timing cycle within microprocessor 140. That cycle counts the interval until the next coincidence between the positive (high) pin 228 and the positive going square wave at 208, which causes the pin 224 on microprocessor 140 to go low again so as to terminate the timing interval. The engine rpms are at once determined by microprocessor 140, whereupon it causes another pin 230 connected to junction 204 to go positive so that the microprocessor 140 can similarly determine the transmission output rpms from the tooth speed of the turning gear 92.

The cycle then repeats, and does so about sixty times per second in the microprocessor 140.

Transducers critically placed about the transmission and engine to provide appropriate electrical frequency signals to the speed connections 82 and 88 can be selected from the group of a variable reluctance magnetic pickup, an optical pickup, and other magnetostrictive or other type pickups which provide a signal proportional, for example, to gear tooth frequency.

The power lever 18 appearing in FIG. 5 has a mechanical connection, not shown, by which it establishes the aforesaid changes of setting of the engine governor in a conventional manner. Such changes could also be accomplished by electrical controls. Separately, the electrical connection by means of the potentiometer 144 serves as the means of constantly monitoring the power lever setting and hence the engine governor setting.

A pull down resistor 232, appropriately grounded, provides for fault protection to the potentiometer power lead 76, as in the case of a broken wire, for example. Two stages 234,236 of RC filtering are present in the power lead, and also present are a pair of series connected clamping diodes 238, 240 poled as shown to protect the power lead against noise spikes; finally, a current limiting resistor 242 leading from the clamping diodes midjunction delivers the monitored power lever voltage setting signal to an analog to digital converter 244. The analog to digital converter 244 is commercially available under the National Semi-Conductor designation ADCO 833 and is found to perform satisfactorily. Linear voltage as regulated to +5V is supplied to the converter 244, suitably bypassed for noise and other protection purposes by a resistor 246, a filter capacitor 248 and a RC network 250. The convertor 244 supplies input to the microprocessor 140 through the various pin leads 252 which are supplied through resistors 254 at +5V by the linear voltage regulator. That input is digital input for ready consumption by the microprocessor 140.

The transmission speed lever 22 is not only digitally monitored in this same way by the converter 244, but is also served so as to supply its own digital command signal to the microprocessor 140 for direct control through pilot valve 132 over the swash plate tilt angle. The pilot valve 132 is a commercially available electrohydraulic proportional servo valve. In other words, it has no mechanical connections similar to the power lever's mechanical connection and hence relies exclusively on digital control over the swash plate.

A watchdog circuit 256 operates through a comparator and a NOT gate 258 as a timer to restart the microprocessor 140 in regular way in case something has meantime gone wrong.

From microprocessor 140, the buffer output line 81 includes a buffer 260 connected to the power meter 83 whereby the indication, shown by the meter needle to the operator, will be to increase or reduce the power lever setting whenever the necessity therefor is determined by the microprocessor 140. Otherwise the meter needle is centered and so remains to indicate its satisfied position under the automatic speed transmission operation.

The microprocessor 140 receives through its input pin 262 the necessary power to run it from the +5V linear voltage regulator. An adjacent pin 264 is connected to the regulator by a decoupling capacitor 266 for blocking power source noise. Another adjacent pin 268 is connected by a resistor 270 to the +5V linear voltage regulator for biasing the microprocessor 140 constantly to use its aforementioned internal memory.

The required input crystal, a CPS Knight, which is connected in standard way is omitted from the showing of the microprocessor 140 in FIG. 5.

The transistors employed in the pulse width modulated swash plate drive circuit 150 of FIG. 5 are all of the NPN type except 292 and 314 which are PNP type. Of the two service connection junctions 272 and 274 of that circuit, the junction 272 has among others, a connection to an output pin 276 on microprocessor 140, a connection through a pull-up resistor 278 to the +5V linear voltage regulator, and a connection to the base electrode of a transistor 280. The transistor emitter is connected to a ground line 282 and the collector is connected, in order, through a resistor 284, a junction 286, a resistor 288, thence to a B+ junction 290 supplied by connection 148.

A second transistor 292, the base electrode of which is connected to junction 286, has the emitter connected through a resistor 294 to the B+ junction 290 and has the base connected through the respective cathode-anode of a diode 296 and the respective cathode-anode of a series connected diode 298 to the B+ junction 290; the elements 294, 296 and 298 provide current limiting protection to the second transistor 292. A pair of series connected clamping diodes 298′ and 300 provide a cathode to anode and another cathode to anode connection down from the B+ junction 290 to ground line 282; they protect against noise spikes and have an intervening junction 302 connected to the collector electrode of the second transistor 292.

In operation, microprocessor 140 causes pin 276 to go high at the same time that it causes junction 274 to go low. The pull-up resistor 278 goes to the same +5V potential at its opposite ends and the correspondingly high junction 272 positively biases the base of transistor 280 so that it conducts. Accordingly, resistor 284 goes less positive at its end connected to junction 286 and causes the base of the second transistor 292 to bias the latter into conducting. So a positive rectangular wave pulse, of modulated width determined by the microprocessor 140, is transmitted from the intervening junction 302 so as to be passed by the output cable 80 through the proportional coil 134 of the pilot valve 132. Suitable cable connectors are indicated in the cable at 304 and suitable anti-noise ferrite beads are indicated therein at 306.

The circuit from coil 134 is completed to ground line 308 in the rest of the circuit in which, because service connection junction 274 is momentarily low, the circuit's respective transistors 310, 312 and 314 respectively are biased so as not to conduct. A pull-up resistor 316 is connected between the +5V linear voltage regulator and the base of a transistor 318 and, unimpeded, gives positive base bias to the transistor 318 causing it to conduct and discharge the positive rectangular wave through a resistor 320 thus completing the circuit to ground line 308. The transistor 318 is protected in the usual way by the resistor 320 in conjunction with another transistor 322 which together form a current limiter on the transistor 318.

The positive rectangular wave ceases when the pin 276 allows the service connection junctions 272 and 274 to reach the same potential levels. The next pulse starts after a predetermined interval, and so forth for the successive pulses in the positive direction as long as continued by the microprocessor.

Negative pulses, in succession, are started with successive operation by the microprocessor 140 causing junction 274 to go high at the same time as junction 272 goes low.

The cycles are repeated in either direction and, with pulse width modulation as determined by the microprocessor, the proportional coil 134 receives an average positive current or negative current or no current as a proportional thing, causing proportional fluid directing action by the servo valve 132 acting as pilot valve.

The purpose of the swash plate drive is to provide amplified electrical hydraulic actuation with precise control. The high-low microprocessor output means that the pin such as pin 276 is impressed with +5V or 0V at extremely low current carrying capacity. The B+ voltage impressed on the drive circuit 150 can fluctuate on the tractor at anywhere from 9 to 16V whereas, despite the current amplification provided by the transistors, the proportional coil 134 is rated at only 7.5V which is the most voltage ever impressed upon the coil terminals by the electrically amplifying transistors. Hydraulic amplification in the pilot valve 132 as shown in FIG. 5 greatly increases the force possible because of responsiveness of the piloted servo valve 130 which readily handles the moving and stopping load under which the swash plate is forced to operate.

The control module 24 as shown in FIG. 5 is not confined to any set number of steps or inflexible sequence or order for its operation, although one flow chart for ease of understanding will be given, simply by way of example and not limitation.

Figure 6:
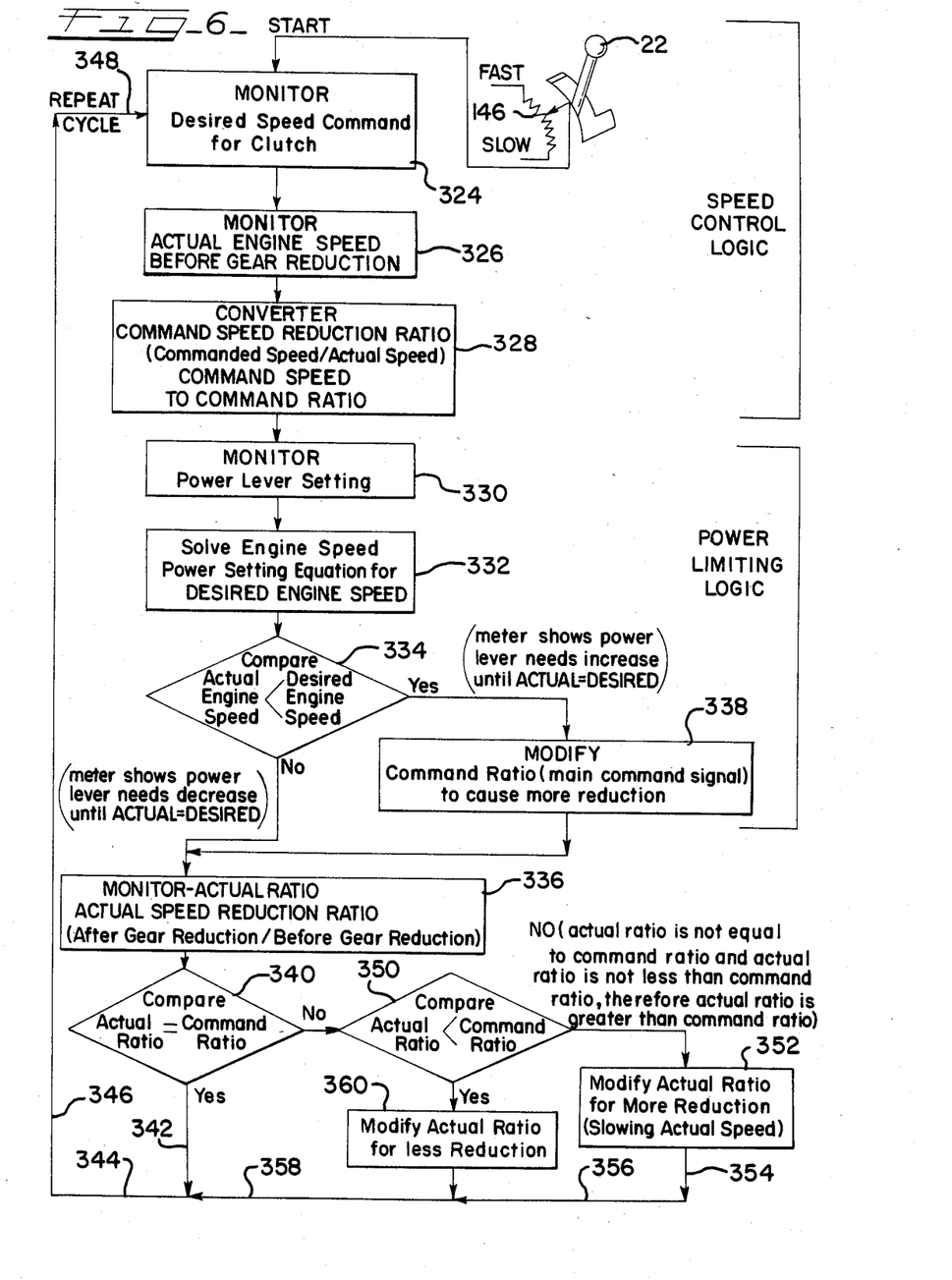
FIG. 6 is a block diagram of the operating sequence the control is programmed to follow.

FLOW CHART—FIG. 6

The starting point for the control module's automatic operation is the proportional control voltage picked off the potentiometer 146, varying with transmission speed control lever 22 as it positions the slider illustrated, and applied as monitored according to block 324 as the desired speed command after the speed transmission effective gear reduction. The next block 326 of the FIG. 6 flow chart indicates the monitoring of actual engine speed before gear reduction, depending at outset of the automatic operation strictly upon the operator's positional setting of the power lever and existing load on the tractor at the time. The converter block 328 next following represents an operation within the microprocessor of constantly recalculating a control parameter, the commanded speed reduction ratio of the speed transmission, determined as the quotient of commanded speed from block 324 divided by actual engine speed from block 326. A further crucial block 330 represents constant monitoring of the power lever setting as initially set by the operator at his desire for the general operation he seeks.

The calculation block 332 next following in the sequence represents use of the power lever setting as parameter for the recalculations, updated sixty times per second, of that currently desired engine speed corresponding to the least brake specific fuel consumption for that power lever setting; the basis is the Power Match curve of FIG. 4, which is the criterion for least BSFC.

Next, diamond 334 represents the microprocessor's digital signal comparison of actual engine speed to the engine speed desired for least BSFC, as scaled numbers. The latter scaled number for want of a better identifying word are termed the computer's reference command whereas the actual speed scaled number compared thereto is termed the second signal. If the actual engine speed by comparison is equal or greater, there will be no change at point of the diamond 334 in the desired speed command ratio being transmitted to block 336; however, if the actual speed is greater by comparison, the meter 83, FIG. 3, will register that a reduction in power lever setting is required to bring actual speed down to equivalence by comparison.

The modify block 338 is inserted as a necessary step in case the actual engine speed monitored shows less by comparison than the digital signal. Specifically, the microprocessor automatically modifies the main speed command signal so as to call for more gear reduction to restore actual engine speed to equivalence; also the meter 83 will start to indicate desirability for an increase of power lever setting to bring about equivalence in case the modified speed command signal is not adequate automatically of itself. So the main speed command signal, modified or unmodified as appropriate, is transmitted (in ratio form as the command speed ratio to sensed actual speed) on to the monitor block 336. Unimpeded, that ratio as a digital signal will be transmitted through monitor block 336, through compare block 340, and thereupon utilized, as indicated by arrow 342, in the input of the swash plate to bring the actual transmission reduction ratio (after Gear Reduction/Before Gear Reduction) and desired command signal ratio (Commanded Speed, After/Actual Speed Before) into equivalence. At this point, the system is operating in its basic mode, the power limiting logic mode which is always the first to be satisfied automatically through more effective gear reduction in the speed transmission.

If the tractor is operating at a ground speed below the commanded speed, for example, because an added load was imposed, as described above, and that load is now released, the control module 24 will reduce the gear reduction until the ground speed equals the desired speed. To accomplish this, the actual ratio signal, which, at a lower ground speed, is less than the command ratio, is transmitted from the compare block 340 to the compare block 350 and then to the modify block 360 which provides less gear reduction, and therefore increased ground speed, until the ground speed is brought up to the desired speed, i.e., until the actual ratio is brought up into equivalence with the command ratio.

Until that equivalence is satisfied, the microprocessor will be operating exclusively in its programmed power logic mode although, in the meantime, the suppressed, second speed logic mode earlier mentioned will be continually operating entirely subordinate to, and overcontrolled by, the dominant power logic mode.

So in properly subdued tone, the monitor block 336 for the speed logic indicated continually monitors the actual speed reduction gear ratio and, as represented by compare block 340, the comparison is continually being made to sense when the power logic mode modified signal to the transmission has brought the actual ratio back up to the command ratio (satisfying the point of least BSFC). When that point is sensed, and when it is exceeded with the power logic mode remaining satisfied, the microprocessor goes into its speed logic mode.

Because the rpms of actual transmission output speed and actual engine speed are constantly known, the block 336 representing constant monitoring of the actual speed reduction ratio functions in the same way as block 328 for the commanded ratio. Therefore, the actual speed reduction ratio from block 336 and commanded speed reduction ratio from block 328, when compared at the step represented by diamond 340, will in the ideal case find equivalence of digital signal when the main command signal is modified just right. So the cycle will be repeated rapidly again and again, just as soon as the repeat path 342, 344, 346, and 348 through the microprocessor makes its first completion.

In case the engine would speed up beyond its desired speed, as in the tractor encountering a downslope, the speed logic mode reacts through the compare blocks 340 and 350 and the modify box 352 to cause more gear reduction; in other words the engine speed-up, causing point C (FIG. 4) to be reached, decreases the command ratio by raising the denominator, engine speed, so that, by comparison, the actual reduction ratio by staying the same becomes the greater ratio of the two, relatively speaking.

Therefore, as caused by the slight downslope of Example II, the greater effective gear reduction required in block 352 is achieved by appropriately modifying the actual ratio at that point and the thus modified actual ratio signal is transmitted as the new output in path 354,356 thus changing the proportional coil 134 and swash-plate tilt angle into some less positive angular direction to increase the reduction to account for the higher engine speed. So the constant ground speed is sustained as desired on the slight downslope. If the engine speed decreases, as when the tractor levels out, the command ratio will then exceed the actual ratio and the signal will go from compare block 350 to modify block 360 which will modify the ratio to less reduction to maintaining constant ground speed until the engine comes down to the desired speed.

In contrast, consider the foregoing Example I situation in which a higher ground speed at the initial 1:1.5 gear reduction ratio was automatically temporarily slowed because of an assumed extreme but momentary rimpull overload. The predominant primary or power limiting logic caused more gear reduction to maintain the engine speed, and suppressed the speed mode which would have required less reduction to maintain ground speed. Then with the tractor overload past and gone, and with the initial (lower) rimpull restored, the microprocessor, still in its power limiting mode, because the ground speed is less than the desired speed set by speed lever 22, operates to restore the initial higher ground speed in the expected way, by means of less effective gear reduction (diamond 350, block 360) until the initial 1:1.5 is reached, restoring the former BSFC stability.

The modify block 352 and the just mentioned modify block 360 are referred to in later to be discussed aspects of the speed control logic mode of the control module.

MIN. BSFC CURVE—FIG. 7

Figure 7:
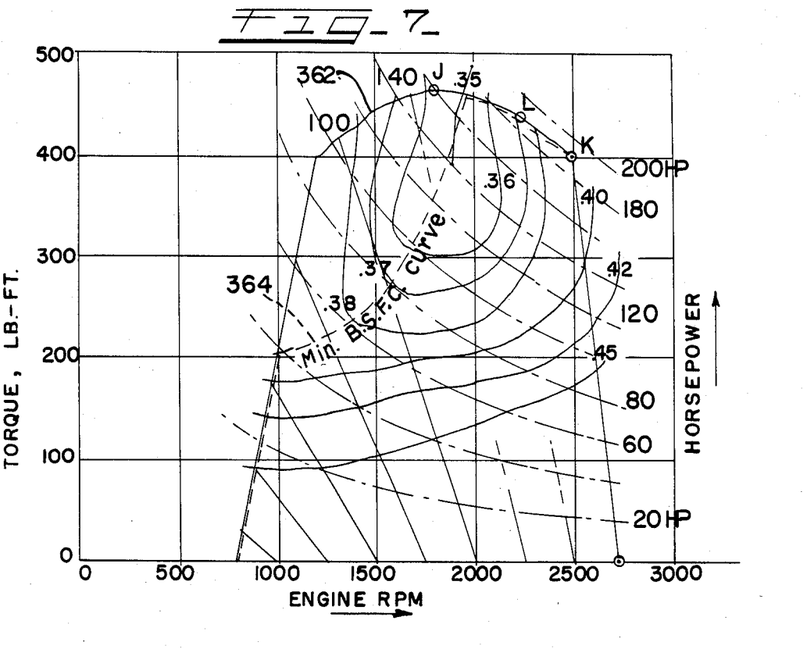
FIG. 7 is an eng. rpm-torque graph showing rated power torque, with superposed plots thereon of the governor droop curves, constant BSFC loops, and the discerned pattern of least BSFC points, the locus of which generates a single discrete minimum pounds of fuel curve.

The wide open throttle torque curve indicated at 362 in this figure is representative of automotive diesel engines in general use, is a simulation of the operating characteristics of a commercial International Harvester DTI-466B engine, and is a result of a scaling from the actual curve of a counterpart commercial Harvester DT-436 direct injection, six cylinder diesel truck engine. The points JKL indicated on the curve bear noting.

In the prior art, the peak torque point J is crucial to known anti-stall controls, whose straightforward purpose is to avoid passing that point of operation during engine slowdown because the immediate torque dropoff thereafter will stall out the engine and cause it to lose the load. Terming that purpose straightforward is for the reason it is strictly negative, to avoid actually reaching the single overload point by automatically, just beforehand, downshifting the transmission and slowing the vehicle. See "Earth Movers Dig Into Computers,+ *Chilton's Truck & Off-Highway Industries,* January-February, 1983, pp 33-35 and inset article.

Another prior art notion in vogue in the tractor art, is to shift up and throttle back, thus going in the direction of losing the load but actually stopping short of the torque peak so as to meantime keep safe and yet save some fuel.

The direction taken by my invention is not so merely avoiding a single taboo operating point, or for upshifting. The direction will be recognized from the power limiting mode hereof as somewhat the opposite, to keep down-shifting a variable transmission as it loads up to stay on the least BSFC curve as well as for readjusting the power lever when needed so that the engine will positively follow all points defined by a least BSFC curve. This reduces fuel consumption. For example, the essentially straight portion of torque curve 362 defined at rated power by points K and L will be seen closely to parallel the constant 180 HP dotted line and the constant 200 HP dotted line appearing in the FIG. 7 graph. But operating at full-throttle as indicated at point K (approximately 190 HP) would consume excess fuel, according to the terminology of the present invention, at high idle setting of the power lever, whereas operating automatically the same way but at point L herein will in some instances be accomplished at a 5 percent fuel saving, nevertheless yielding about the same 190 horsepower. That fuel saving has been observed in one or more tractors embodying the present invention.

Superimposed on the graph of FIG. 7 are the diagonally upwardly and leftwardly extending straight governor curves, starting from the bottom for instance at 1000 engine rpm, 1500 engine rpm, 2000 rpm, etc. corresponding to different settings of the power lever 18.

Also, superimposed are the known, seemingly concentric constant brake specific fuel consumption curves, rather much centering in regular way about the 0.35 curve indicative of 0.35 pounds of fuel consumed by the engine per horsepower hour. Radially outwardly therefrom appear the surrounding curves marked for respectively 0.36 pounds, 0.37 pounds, 0.38 pounds, 0.40 pounds, 0.42 pounds, and 0.45 pounds (0.2 kg) per horsepower hour.

Again pursuing the constant horsepower lines (dotted) we can perceive that the 60 horsepower line is closest to the 0.38 pound curve at only one point, the 80 horsepower line is closest to the 0.37 pound curve at only one point and so forth. That resulting pattern of points establishes the locus of points for a smooth broken line curve 364 joining all such points and being essentially coincident at the upper right end with the 0.35 pound curve which is the most saving of all in effective fuel utility. It follows that such curve 364 is truly representative of near-minimum brake specific fuel consumption for the engine throughout the entire range of horsepowers enveloped by the wide open throttle torque curve 362 for the engine.

That same locus of points once established according to a figure such as FIG. 7 readily transfers to a figure, such as FIG. 4 preceding, as a conveniently smooth curve 136 in the latter figure approximating the least brake specific fuel consumption and vital to the present control module.

That curve 136 of FIG. 4 represents simply a predetermined consecutive series of desired engine speed values productive of substantially minimum brake specific fuel consumption for a range of engine power settings; so it can be stored in the microprocessor memory as a rough table if the memory is somewhat restrictive. With extensive memory capability of the microprocessor, the table can be stored with only incremental differences in the speed values not requiring interpolation.

However, with average memory assigned as contemplated to the present microprocessor, reducing the curve 136 in known way to a simple engine speed equation will enable the microprocessor constantly to resolve the equation for solutions in precise digital terms for each and every setting to which the power lever 18, is adjusted by the operator. So actual speed becomes a function of the power lever setting in the equation, the setting constituting the variable control parameter of which the changing values are constantly being entered in the equation by the computer for recalculation of same.

The wide open throttle torque curve for a combined engine-transmission train having infinite variability actually consists of an infinite number of curves constituting a family which keeps peaking more and more with more speed reduction in the infinitely variable transmission; the reason is the torque capability naturally becomes higher and higher with succeeding increases in transmission gear reduction ratio.

Figure 8:
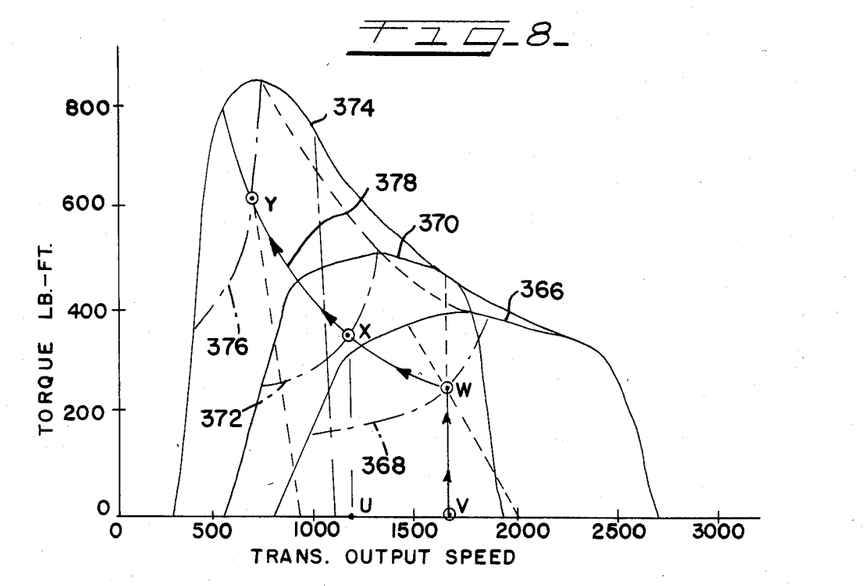
FIG. 8 is a transmission rpm-torque graph showing rated power torque for three arbitrary but representative transmission gear reduction ratios, each with its individual superposed least BSFC curve, and the discerned pattern of least BSFC points the locus of which generates a discrete single line anti-lug curve.

POWER TRAIN CURVES—FIG. 8

In the graph of this figure with transmission output torque plotted against transmission output speed, only three curves appear of the wide open throttle torque for the overall engine-transmission combination.

At the transmission's least speed reduction ratio which is essentially 1:1, the torque curve 366 therefor closely approximates the torque curve of the engine alone and would be identical thereto if the transmission happened to be geared to deliver an exact 1:1 ratio. In the manner as done previously, the least BSFC broken line curve 368 is readily superimposed, effective during only the approximately 1:1 reduction ratio transmission setting.

Visibly distinct, the overall torque curve 370 is shown constructed for a transmission reduction ratio of 1:1.5, which happens conveniently to occur when the sun gear, previously discussed, is hydraulically locked against retrograde or forward movement. The broken line least BSFC curve 372 is readily superimposed appropriate only to that transmission reduction ratio.

Finally, for visual comparison at the other extreme, the overall train torque curve 374 represents the condition of the transmission providing maximum gear reduction of 1:2.39 for greatly multiplying torque and rimpull. The appropriate least BSFC curve is plotted in broken lines at 376. A pattern of points emerges WXY establishing the locus of least fuel consumption points connected by a smooth average curve 378 for the entire reduction range of the present speed transmission.

As viewed in FIG. 8, the diagonally upwardly and leftwardly directed straight broken lines represent the governor curves of the engine-transmission train.

It can be seen that from the zero torque point U on the transmission output-speed axis that an increase of torque straight up to point X on the reduction range curve 378 will result in minimum brake specific fuel consumption for the transmission setting of 1:1.5 speed reduction. If increased ground resistance to wheel speed causes the control module hereof automatically to provide more gear reduction in the speed transmission, the transmission can readily accommodate as the operating point viewed graphically rises up the curve 378 toward Y thereon.

The starting point W for the overall train torque curve WXY is taken arbitrarily at 1:1 ratio and 2,000 rpm engine speed would be the power lever setting rpm to cause the engine-transmission combination to follow the curve WXY. BSFC curve 368 has an infinite number of points thereon available as starting points depending on the power lever setting. As will be seen, the position of speed lever 22 determines the starting point, for example, point U, for a desired ground speed.

EXAMPLE III

However, a more extreme example will bring out the full adjustment capability of the present automatic power matching train operation. In speed control logic mode and despite governor droop, from a transmission ratio of roughly 1:1.2 at point V on the graph, the constant ground speed or second mode of operation will continue to change the transmission ratio straight up toward operating point W until the ratio increases essentially to 1:1 at W as rimpull load is increased. Thereafter the power limiting logic mode goes into effect automatically as result of the tractor's reaching its load and a slight temporary slow-down of its engine to maintain the tractor on the WXY curve, 378.

Specifically on the reduction range curve 378 for the speed transmission, already producing minimum BSFC in the engine, the transmission upon encountering increased resistance is caused automatically to introduce more gear reduction and, at reaching of the operating point X, the transmission will again have the engine operating at minimum BSFC but at an adjusted transmission ratio of 1:1.5. Further resistance increase of the tractor load shifts the operating point to approach Y, progressing thereto smoothly and always along the reduction range curve 378. And the full multiplication of torque with a torque rise by 2.39 times occurs with the reaching of point Y.

The significance is that, once on the WXY portion, the engine has never lugged, it has been operating always and only on points on the curve at the least BSFC, and entirely automatically with the same power setting and with no change from or intervention by the operator. The reverse pattern is also true as soon as the resistance no longer requires the extreme of 2.39 torque multiplication for sufficient rimpull of the tractor. The striking part to the operator, however, is progress in direction of the arrows on the reduction range, smooth curve 378 where he never detects the engine laboring even though tractor speed naturally slows during a stretch of highly burdensome soil resistance. It will be appreciated, however, that in the constant ground speed mode, between points V and W, least BSFC is not maintained.

EXAMPLE IV

There is a relationship between the modify block 360 of flow diagram FIG. 6 and the transition indicated by arrows from point V straight up to point W in FIG. 8. The control module operates in the second constant ground speed mode beginning at point V where it compares actual ratio with the command ratio and finds that, under increasing torque loading and as the engine slows down, the actual ratio is the lesser. So less actual gear reduction is required than the existing 1:1.2 ratio and the transmission moves toward establishing a 1:1 gear reduction ratio by the time the operating point W is reached, all progressively so as to maintain constant speed in the speed mode for reaching point W, FIG. 8. Therefore, the so-called governor droop illustrated by the natural, broken line, diagonal governor curves is avoided because there is no droop in the constant ground-speed mode of the microprocessor.

EXAMPLE V

The transmission in its secondary speed mode also desirably operates just the opposite way, and automatically does so according to modify block 352 in flow chart FIG. 6, in going through the opposite transition from point W straight down at constant speed toward the aligned zero torque point V, FIG. 8. The circumstance is the gradual removal of appreciable torque-loading on the transmission and thus increased engine speed so that the actual ratio sensed is greater than the command ratio and is readily determined according to the notation between compare diamond 350 and modify block 352, FIG. 6. So, counter to the direction of the arrows, and with constant ground speed maintained between W and V, FIG. 8, the automatic operation changes the transmission from 1:1 at W to a 1:1.2 at V for more gear reduction to counteract the natural loss-of-load speed-up; the slowing-down transmission and unloaded engine speed-up will offset one another, with constant ground speed maintained all during the transition.

By flow chart, FIG. 6, the step represented by block 352 is to modify the command ratio starting at that point W and the thus modified command ratio signal is transmitted as new output in paths 354 and 356, thus changing the proportioning coil, 134 and swash plate tilt angle into some less positive angular direction for more effective gear reduction.

EXAMPLE VI

This example is merely cumulative to Example II preceding, but importantly illustrates what can be carried to an extreme situation very possibly encountered. Let it be assumed that the present tractor is proceeding easily on a slight slope with a heavy wagon lightly in tow, with the power train automatically operating with practically no reduction, let us say a ratio 1:1 for simplicity. The tractor and tow immediately encounter an extended severe downhill condition so as to operate at some unmarked point vertically over point C, FIG. 4, such point in fact being a motoring point above no load curve 138 that is, the wagon is pushing the tractor. The power mode is fully satisfied because the control sensors of the microprocessor serve only to assure it while in that mode that the actual engine speed is kept up to command speed or, in graphical terms, kept above the power match curve 136 in FIG. 4 and the ground speed is at the desired speed.

Due, therefore, to the relative decrease of command ratio in this assumed situation, the actual ratio by comparison becomes the larger of the two and gives rise to a signal which can be represented by the reaction of block 352 as required in the FIG. 6 flow chart. Consequently, as the rolling wagon tends to force the tractor downhill faster, a modified command ratio signal from block 352 is transmitted in paths 354,356 to cause the swash plate to establish more and more effective gear reduction up to approximately a 1:2 or perhaps a 1:2.39 ratio. The engine is thus being motored to increasing speeds through the transmission by the wagon and tractor due to their downhill coast. So the full braking capability of the engine is brought to bear automatically in the speed mode to ensure positive vehicle control.

Besides applying torque to the rest of the power train including the drive axles illustrated herein, the engine of the present power train separately but equally effectively drives the conventional single speed or dual speed power take-off (PTO) shaft of the tractor, not shown. The control module does not affect the PTO output although the effect of the PTO loading is included in its operation. In other words, the two sensors of speed and other sensors hereof take into account all engine loading for engine optimization strictly with automatic transmission adjustment. But if the transmission were in neutral, for example, the PTO would be independent of the control module.

It is evident the invention equally applies to other continuously variable transmissions (CVT's) including the lower horsepower, belt drive type, continuously variable mechanical transmissions. Also, the present principles apply with equal force to further engine-CVT power trains, hydrostatic and hydro-mechanical and others. Although perhaps not ideal for maintaining the engine exactly on the least BSFC curve, the invention could also be applied to step change power shift transmissions. Indeed, given enough gears, a power shift transmission eventually approaches a continuously variable transmission.

Variations within the spirit and scope of the invention described are equally comprehended by the foregoing description.

What is claimed is:

1. Efficiency control for an engine-transmission power train of a fuel-powered vehicle of the type including a fixed range transmission having a plurality of fixed, specific reduction ratios providing corresponding speed ranges and a variable range transmission providing a continuously variable range of speed reduction ratios, said variable range transmission being equipped with transmission pump and motor hydraulic units with variable displacement to vary their speed ratio, and electrically controlled hydraulic means to vary such displacement and correspondingly vary the variable transmission output speed and torque, said variable transmission including manual means for varying the variable transmission output speed and torque comprising:

a command signal generator for connection to the electrical hydraulic means to provide thereto a main command signal for setting desired output speed of the transmission by varying the pump-and-motor speed-ratio of same as it is driven under engine power;

means for storing in a memory a predetermined consecutive series of desired engine speed values which result in substantially minimum brake specific fuel consumption for a range of enging power setting;

first means connected to the memory for generating a reference command indicative of that particular engine speed value which is desired corresponding to the actual engine power setting; and second means for generating a second signal indicative of the actual engine speed;

third means for generating a third signal indicative of the setting of the manual means for varying the variable transmission output speed and torque;

said first and second and third means having means connected to the signal generator for modifying the main command signal automatically, in response to a deficiency of one of said reference command and second signal compared to the other.

* * * * *